(12) United States Patent
D'Souza et al.

(10) Patent No.: US 7,966,013 B2
(45) Date of Patent: Jun. 21, 2011

(54) ROAMING GATEWAY ENABLING LOCATION BASED SERVICES (LBS) ROAMING FOR USER PLANE IN CDMA NETWORKS WITHOUT REQUIRING USE OF A MOBILE POSITIONING CENTER (MPC)

(75) Inventors: Myron D'Souza, Seattle, WA (US); Gordon John Hines, Kirkland, WA (US); David Bartnik, Bothell, WA (US); Joseph Hannan, Snoqualmie, WA (US); Joel Groen, Seattle, WA (US); William Wells, Federal Way, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 711 days.

(21) Appl. No.: 11/979,493

(22) Filed: Nov. 5, 2007

(65) Prior Publication Data

US 2008/0242296 A1  Oct. 2, 2008

(51) Int. Cl.
*H04W 4/00* (2009.01)

(52) U.S. Cl. ............... 455/432.1; 455/433; 455/435.1; 455/456.1; 455/456.2; 455/456.3; 455/456.5; 455/456.6; 455/457; 370/310.2; 370/328

(58) Field of Classification Search .............. 455/432.1, 455/433, 456.1–457; 370/310, 310.2, 328
See application file for complete search history.

(56) References Cited

U.S. PATENT DOCUMENTS

| | | | |
|---|---|---|---|
| 1,103,073 A | 7/1914 | O'Connel | |
| 4,445,118 A | 4/1984 | Taylor et al. | |
| 4,494,119 A | 1/1985 | Martinez | |
| 4,651,156 A | 3/1987 | Kamil | |
| 4,706,275 A | 11/1987 | Kamil | |
| 4,891,638 A | 1/1990 | Davis | |
| 4,891,650 A | 1/1990 | Scheffer | |
| 4,910,767 A | 3/1990 | Brugliera et al. | |
| 4,952,928 A | 8/1990 | Carroll | |
| 4,972,484 A | 11/1990 | Theile | |
| 5,014,206 A | 5/1991 | Scribner | |
| 5,043,736 A | 8/1991 | Darnell | |
| 5,055,851 A | 10/1991 | Sheffer | |

(Continued)

FOREIGN PATENT DOCUMENTS

WO  PCT/SE98/01887  10/1998

(Continued)

OTHER PUBLICATIONS

Location based Services V2 Roaming Support (Non proprietary), 80-V8470-2NP A, dated Jan. 27, 2005, pp. 1-56.*

(Continued)

*Primary Examiner* — Stephen M D'Agosta
(74) *Attorney, Agent, or Firm* — William H. Bollman (57) ABSTRACT

LBS support to CDMA mobiles while roaming on another network. IS-801 session data is routed by a routing gateway to a correct visited network PDE that contains correct BSA data, which is used to return assistance data to an interrogating mobile device. A standalone exemplary roaming LBS routing gateway (XRG) provides network connectivity between PDE equipment in multiple carrier networks. Conventional LBS roaming support is defined via the use of Mobile Position Centers (MPCs). The invention implements a roaming LBS gateway to enable roaming between CDMA carriers that are only using a PDE (Positioning Determining Entity) for this purpose, since a mobile position center (MPC) is typically an optional network node according to location based services (LBS) specifications.

12 Claims, 4 Drawing Sheets

U.S. PATENT DOCUMENTS

| | | |
|---|---|---|
| 5,068,656 A | 11/1991 | Sutherland |
| 5,068,891 A | 11/1991 | Marshall |
| 5,070,329 A | 12/1991 | Jasimaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Scheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Caroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicke |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,432,841 A | 7/1995 | Rimer |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaugh |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | Dennison |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,689,245 A | 11/1997 | Noreen |
| 5,699,053 A | 12/1997 | Jonsson |
| 5,704,029 A | 12/1997 | Wright, Jr. |
| 5,721,781 A | 2/1998 | Deo |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,787,357 A | 7/1998 | Salin |
| 5,794,142 A | 8/1998 | Vantilla |
| 5,797,094 A | 8/1998 | Houde |
| 5,797,096 A | 8/1998 | Lupien |
| 5,802,492 A | 9/1998 | DeLorrme |
| 5,806,000 A | 9/1998 | Vo |
| 5,809,415 A | 9/1998 | Rossman |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khue |
| 5,835,907 A | 11/1998 | Newman |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,920,821 A | 7/1999 | Seaholtz |
| 5,922,074 A | 7/1999 | Richard |
| 5,930,250 A | 7/1999 | Klok |
| 5,930,701 A | 7/1999 | Skog |
| 5,943,399 A | 8/1999 | Banister |
| 5,945,944 A | 8/1999 | Krasner |
| 5,946,629 A | 8/1999 | Sawyer |
| 5,946,630 A | 8/1999 | Willars |
| 5,950,130 A | 9/1999 | Coursey |
| 5,950,137 A | 9/1999 | Kim |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,983,099 A | 11/1999 | Yao |
| 5,987,323 A | 11/1999 | Houtari |
| 5,998,111 A | 12/1999 | Abe |
| 5,999,124 A | 12/1999 | Sheynblat |
| 6,014,602 A | 1/2000 | Kithol |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |

| | | | | | | |
|---|---|---|---|---|---|---|
| 6,067,045 | A | 5/2000 | Castelloe | 6,427,001 B1 | 7/2002 | Contractor |
| 6,070,067 | A | 5/2000 | Nguyen | 6,433,734 B1 | 8/2002 | Krasner |
| 6,075,982 | A | 6/2000 | Donovan | 6,434,381 B1 | 8/2002 | Moore |
| 6,081,229 | A | 6/2000 | Soliman | 6,442,391 B1 | 8/2002 | Johansson |
| 6,081,508 | A | 6/2000 | West | 6,449,473 B1 | 9/2002 | Raivisto |
| 6,085,320 | A | 7/2000 | Kaliski, Jr. | 6,449,476 B1 | 9/2002 | Hutchinson, IV |
| 6,101,378 | A | 8/2000 | Barabush | 6,456,852 B2 | 9/2002 | Bar et al. |
| 6,104,931 | A | 8/2000 | Havinis | 6,463,272 B1 | 10/2002 | Wallace |
| 6,108,533 | A | 8/2000 | Brohoff | 6,477,150 B1 | 11/2002 | Maggenti |
| 6,122,503 | A | 9/2000 | Daly | 6,504,491 B1 | 1/2003 | Christians |
| 6,122,520 | A | 9/2000 | Want | 6,505,049 B1 | 1/2003 | Dorenbosch |
| 6,124,810 | A | 9/2000 | Segal | 6,510,387 B2 | 1/2003 | Fuchs |
| 6,131,028 | A | 10/2000 | Whitington | 6,512,922 B1 | 1/2003 | Burg |
| 6,131,067 | A | 10/2000 | Girerd | 6,512,930 B2 | 1/2003 | Sandegren |
| 6,133,874 | A | 10/2000 | Krasner | 6,515,623 B2 | 2/2003 | Johnson |
| 6,134,483 | A | 10/2000 | Vayanos | 6,519,466 B2 | 2/2003 | Pande |
| 6,138,003 | A | 10/2000 | Kingdon | 6,522,682 B1 | 2/2003 | Kohli |
| 6,148,197 | A | 11/2000 | Bridges | 6,526,026 B1 | 2/2003 | Menon |
| 6,148,198 | A | 11/2000 | Anderson | 6,529,500 B1 | 3/2003 | Pandharipande |
| 6,149,353 | A | 11/2000 | Nilsson | 6,529,829 B2 | 3/2003 | Turetzky |
| 6,150,980 | A | 11/2000 | Krasner | 6,531,982 B1 | 3/2003 | White |
| 6,154,172 | A | 11/2000 | Piccionelli | 6,538,757 B1 | 3/2003 | Sansone |
| 6,169,891 | B1 | 1/2001 | Gorham | 6,539,200 B1 | 3/2003 | Schiff |
| 6,169,901 | B1 | 1/2001 | Boucher | 6,539,232 B2 | 3/2003 | Hendrey et al. |
| 6,169,902 | B1 | 1/2001 | Kawamoto | 6,539,304 B1 | 3/2003 | Chansarkar |
| 6,173,181 | B1 | 1/2001 | Losh | 6,542,464 B1 | 4/2003 | Takeda |
| 6,178,505 | B1 | 1/2001 | Schnieder | 6,542,734 B1 | 4/2003 | Abrol |
| 6,178,506 | B1 | 1/2001 | Quick, Jr. | 6,542,743 B1 | 4/2003 | Soliman |
| 6,181,935 | B1 | 1/2001 | Gossman | 6,549,776 B1 | 4/2003 | Joong |
| 6,188,354 | B1 | 2/2001 | Soliman | 6,549,844 B1 | 4/2003 | Egberts |
| 6,188,752 | B1 | 2/2001 | Lesley | 6,553,236 B1 | 4/2003 | Dunko |
| 6,188,909 | B1 | 2/2001 | Alananra | 6,556,832 B1 | 4/2003 | Soliman |
| 6,189,098 | B1 | 2/2001 | Kaliski, Jr. | 6,560,456 B1 | 5/2003 | Lohtia et al. |
| 6,195,557 | B1 | 2/2001 | Havinis | 6,560,461 B1 | 5/2003 | Fomukong |
| 6,198,431 | B1 | 3/2001 | Gibson | 6,560,534 B2 | 5/2003 | Abraham |
| 6,199,045 | B1 | 3/2001 | Giniger | 6,564,261 B1 | 5/2003 | Gudjonsson |
| 6,199,113 | B1 | 3/2001 | Alegre | 6,570,530 B2 | 5/2003 | Gaal |
| 6,205,330 | B1 | 3/2001 | Windbladh | 6,571,095 B1 | 5/2003 | Koodli |
| 6,208,290 | B1 | 3/2001 | Krasner | 6,574,558 B2 | 6/2003 | Kohli |
| 6,208,854 | B1 | 3/2001 | Roberts | 6,580,390 B1 | 6/2003 | Hay |
| 6,215,441 | B1 | 4/2001 | Moeglein | 6,584,552 B1 | 6/2003 | Kuno |
| 6,219,557 | B1 | 4/2001 | Havinis | 6,587,691 B1 | 7/2003 | Granstam |
| 6,223,046 | B1 | 4/2001 | Hamill-Keays | 6,594,500 B2 | 7/2003 | Bender |
| 6,226,529 | B1 | 5/2001 | Bruno | 6,597,311 B2 | 7/2003 | Sheynblat |
| 6,239,742 | B1 | 5/2001 | Krasner | 6,600,927 B2 | 7/2003 | Hamilton |
| 6,247,135 | B1 | 6/2001 | Feaugue | 6,603,973 B1 | 8/2003 | Foladare |
| 6,249,680 | B1 | 6/2001 | Wax | 6,606,495 B1 | 8/2003 | Korpi |
| 6,249,744 | B1 | 6/2001 | Morita | 6,606,554 B2 | 8/2003 | Edge |
| 6,249,873 | B1 | 6/2001 | Richard | 6,609,004 B1 | 8/2003 | Morse |
| 6,253,203 | B1 | 6/2001 | O'Flaherty | 6,611,757 B2 | 8/2003 | Brodie |
| 6,260,147 | B1 | 7/2001 | Quick, Jr. | 6,618,593 B1 | 9/2003 | Drutman |
| 6,266,614 | B1 | 7/2001 | Alumbaugh | 6,618,670 B1 | 9/2003 | Chansarkar |
| 6,275,692 | B1 | 8/2001 | Skog | 6,621,452 B2 | 9/2003 | Knockeart |
| 6,275,849 | B1 | 8/2001 | Ludwig | 6,621,810 B1 * | 9/2003 | Leung .................... 370/338 |
| 6,278,701 | B1 | 8/2001 | Ayyagari | 6,628,233 B2 | 9/2003 | Knockeart |
| 6,289,373 | B1 | 9/2001 | Dezonno | 6,633,255 B2 | 10/2003 | Krasner |
| 6,297,768 | B1 | 10/2001 | Allen, Jr. | 6,640,184 B1 | 10/2003 | Rabe |
| 6,307,504 | B1 | 10/2001 | Sheynblat | 6,650,288 B1 | 11/2003 | Pitt |
| 6,308,269 | B2 | 10/2001 | Proidl | 6,661,372 B1 | 12/2003 | Girerd |
| 6,313,786 | B1 | 11/2001 | Sheynblat | 6,665,539 B2 | 12/2003 | Sih |
| 6,317,594 | B1 | 11/2001 | Gossman | 6,665,541 B1 | 12/2003 | Krasner |
| 6,321,091 | B1 | 11/2001 | Holland | 6,671,620 B1 | 12/2003 | Garin |
| 6,321,092 | B1 | 11/2001 | Fitch | 6,677,894 B2 | 1/2004 | Sheynblat |
| 6,321,257 | B1 | 11/2001 | Kotala | 6,680,694 B1 | 1/2004 | Knockheart |
| 6,324,542 | B1 | 11/2001 | Lent | 6,680,695 B2 | 1/2004 | Turetzky |
| 6,327,473 | B1 | 12/2001 | Soliman | 6,687,504 B1 | 2/2004 | Raith |
| 6,327,479 | B1 | 12/2001 | Mikkola | 6,691,019 B2 | 2/2004 | Seeley |
| 6,330,454 | B1 | 12/2001 | Verdonk | 6,694,258 B2 | 2/2004 | Johnson |
| 6,333,919 | B2 | 12/2001 | Gaffney | 6,697,629 B1 | 2/2004 | Grilli |
| 6,360,093 | B1 | 3/2002 | Ross | 6,698,195 B1 | 3/2004 | Hellinger |
| 6,360,102 | B1 | 3/2002 | Havinis | 6,701,144 B2 | 3/2004 | Kirbas |
| 6,363,254 | B1 | 3/2002 | Jones | 6,703,971 B2 | 3/2004 | Pande |
| 6,367,019 | B1 | 4/2002 | Ansell | 6,703,972 B2 | 3/2004 | Van Diggelen |
| 6,370,389 | B1 | 4/2002 | Isomursu | 6,704,651 B2 | 3/2004 | Van Diggelen |
| 6,377,209 | B1 | 4/2002 | Krasner | 6,707,421 B1 | 3/2004 | Drury |
| 6,400,314 | B1 | 6/2002 | Krasner | 6,714,793 B1 | 3/2004 | Carey |
| 6,400,958 | B1 | 6/2002 | Isomursu | 6,718,174 B2 | 4/2004 | Vayanos |
| 6,411,254 | B1 | 6/2002 | Moeglein | 6,720,915 B2 | 4/2004 | Sheynblat |
| 6,421,002 | B2 | 7/2002 | Krasner | 6,721,578 B2 | 4/2004 | Minear |

| | | | | | | |
|---|---|---|---|---|---|---|
| 6,721,871 B2 | 4/2004 | Piispanen | | 6,917,331 B2 | 7/2005 | Gronemeyer |
| 6,724,342 B2 | 4/2004 | Bloebaum | | 6,930,634 B2 | 8/2005 | Peng |
| 6,725,159 B2 | 4/2004 | Krasner | | 6,937,187 B2 | 8/2005 | Van Diggelen |
| 6,728,701 B1 | 4/2004 | Stoica | | 6,937,872 B2 | 8/2005 | Krasner |
| 6,731,940 B1 | 5/2004 | Nagendran | | 6,940,826 B1 | 9/2005 | Simard |
| 6,734,821 B2 | 5/2004 | Van Diggelen | | 6,940,950 B2 | 9/2005 | Dickinson et al. |
| 6,738,013 B2 | 5/2004 | Orler | | 6,941,144 B2 | 9/2005 | Stein |
| 6,738,800 B1 | 5/2004 | Aquilon | | 6,944,540 B2 | 9/2005 | King |
| 6,741,842 B2 | 5/2004 | Goldberg | | 6,947,772 B2 | 9/2005 | Minear |
| 6,744,856 B2 | 6/2004 | Karnik | | 6,950,058 B1 | 9/2005 | Davis |
| 6,744,858 B1 | 6/2004 | Ryan | | 6,957,068 B2 * | 10/2005 | Hutchison et al. .......... 455/435.2 |
| 6,745,038 B2 | 6/2004 | Callaway, Jr. | | 6,957,073 B2 | 10/2005 | Bye |
| 6,747,596 B2 | 6/2004 | Orler | | 6,961,562 B2 | 11/2005 | Ross |
| 6,748,195 B1 | 6/2004 | Phillips | | 6,963,557 B2 | 11/2005 | Knox |
| 6,751,464 B1 | 6/2004 | Burg | | 6,965,754 B2 | 11/2005 | King |
| 6,756,938 B2 | 6/2004 | Zhao | | 6,965,767 B2 | 11/2005 | Maggenti |
| 6,757,544 B2 | 6/2004 | Rangarajan | | 6,968,044 B2 | 11/2005 | Beason |
| 6,757,545 B2 | 6/2004 | Nowak | | 6,970,917 B1 | 11/2005 | Kushwaha |
| 6,771,742 B2 | 8/2004 | McCalmont | | 6,973,320 B2 | 12/2005 | Brown |
| 6,771,971 B2 | 8/2004 | Smith | | 6,975,266 B2 | 12/2005 | Abraham |
| 6,772,340 B1 | 8/2004 | Peinado | | 6,978,453 B2 | 12/2005 | Rao |
| 6,775,255 B1 | 8/2004 | Roy | | 6,980,816 B2 | 12/2005 | Rohler |
| 6,775,267 B1 | 8/2004 | Kung | | 6,985,747 B2 | 1/2006 | Chithambaram |
| 6,775,534 B2 | 8/2004 | Lindgren | | 6,993,355 B1 | 1/2006 | Pershan |
| 6,775,655 B1 | 8/2004 | Peinado | | 6,996,720 B1 | 2/2006 | DeMello |
| 6,775,802 B2 | 8/2004 | Gaal | | 6,999,782 B2 | 2/2006 | Shaughnessy |
| 6,778,136 B2 | 8/2004 | Gronemeyer | | 7,024,321 B1 | 4/2006 | Deninger |
| 6,778,885 B2 | 8/2004 | Agashe | | 7,024,393 B1 | 4/2006 | Peinado |
| 6,781,963 B2 | 8/2004 | Crockett | | 7,047,411 B1 | 5/2006 | DeMello |
| 6,788,249 B1 | 9/2004 | Farmer | | 7,065,351 B2 | 6/2006 | Carter |
| 6,795,444 B1 | 9/2004 | Vo | | 7,065,507 B2 | 6/2006 | Mohammed |
| 6,795,699 B1 | 9/2004 | McGraw | | 7,072,667 B2 | 7/2006 | Olrik |
| 6,799,049 B1 | 9/2004 | Zellner | | 7,079,857 B2 | 7/2006 | Maggenti |
| 6,799,050 B1 | 9/2004 | Krasner | | 7,016,717 B2 | 9/2006 | Rousseau et al. |
| 6,801,159 B2 | 10/2004 | Swope | | 7,103,018 B1 | 9/2006 | Hansen |
| 6,804,524 B1 | 10/2004 | Vandermaijden | | 7,103,574 B1 | 9/2006 | Peinado |
| 6,807,534 B1 | 10/2004 | Erickson | | 7,106,717 B2 * | 9/2006 | Rousseau et al. ............. 370/338 |
| 6,810,323 B1 | 10/2004 | Bullock | | 7,110,773 B1 | 9/2006 | Wallace |
| 6,813,264 B2 | 11/2004 | Vassilovski | | 7,136,466 B1 | 11/2006 | Gao |
| 6,813,560 B2 | 11/2004 | Van Diggelen | | 7,136,838 B1 | 11/2006 | Peinado |
| 6,816,111 B2 | 11/2004 | Krasner | | 7,151,946 B2 | 12/2006 | Maggenti |
| 6,816,580 B2 | 11/2004 | Timmins | | 7,174,153 B2 | 2/2007 | Ehlers |
| 6,816,710 B2 | 11/2004 | Krasner | | 7,177,397 B2 | 2/2007 | McCalmont |
| 6,816,719 B1 | 11/2004 | Heinonen | | 7,177,398 B2 | 2/2007 | Meer |
| 6,816,734 B2 | 11/2004 | Wong | | 7,177,399 B2 | 2/2007 | Dawson |
| 6,820,269 B2 | 11/2004 | Kogan | | 7,200,380 B2 | 4/2007 | Havlark |
| 6,829,475 B1 | 12/2004 | Lee | | 7,209,758 B1 | 4/2007 | Moll et al. |
| 6,832,373 B2 | 12/2004 | O'Neill | | 7,209,969 B2 | 4/2007 | Lahti |
| 6,839,020 B2 | 1/2005 | Geier | | 7,218,940 B2 | 5/2007 | Niemenna |
| 6,839,021 B2 | 1/2005 | Sheynblat | | 7,221,959 B2 | 5/2007 | Lindquist |
| 6,839,417 B2 | 1/2005 | Weisman | | 7,145,900 B2 | 7/2007 | Lamb |
| 6,842,715 B1 | 1/2005 | Gaal | | 7,245,900 B1 | 7/2007 | Lamb |
| 6,847,618 B2 | 1/2005 | Laursen | | 7,260,186 B2 | 8/2007 | Zhu |
| 6,847,822 B1 | 1/2005 | Dennison | | 7,260,384 B2 | 8/2007 | Bales et al. |
| 6,853,916 B2 | 2/2005 | Fuchs et al. | | 7,321,773 B2 | 1/2008 | Hines |
| 6,856,282 B2 | 2/2005 | Mauro | | 7,330,899 B2 | 2/2008 | Wong |
| 6,861,980 B1 | 3/2005 | Rowitch | | 7,333,480 B1 | 2/2008 | Clarke |
| 6,865,171 B1 | 3/2005 | Nilsson | | 7,369,508 B2 | 5/2008 | Parantainen |
| 6,865,395 B2 | 3/2005 | Riley | | 7,369,530 B2 | 5/2008 | Keagy |
| 6,867,733 B2 | 3/2005 | Sandhu | | 7,382,773 B2 | 6/2008 | Schoeneberger |
| 6,867,734 B2 | 3/2005 | Voor | | 7,394,896 B2 | 7/2008 | Norton |
| 6,873,854 B2 | 3/2005 | Crockett | | 7,424,293 B2 * | 9/2008 | Zhu ............................ 455/432.1 |
| 6,876,734 B1 | 4/2005 | Summers | | 7,426,380 B2 * | 9/2008 | Hines et al. ................ 455/404.2 |
| 6,882,850 B2 | 4/2005 | McConnell et al. | | 7,428,571 B2 | 9/2008 | Ichimura |
| 6,885,874 B2 | 4/2005 | Grube | | 7,436,785 B1 | 10/2008 | McMullen |
| 6,885,940 B2 | 4/2005 | Brodie | | 7,440,442 B2 | 10/2008 | Grabelsky |
| 6,888,497 B2 | 5/2005 | King | | 7,495,608 B1 * | 2/2009 | Chen et al. ............... 342/357.09 |
| 6,888,932 B2 | 5/2005 | Snip | | 7,573,982 B2 | 8/2009 | Breen |
| 6,895,238 B2 | 5/2005 | Newell | | 7,602,886 B1 | 10/2009 | Beech |
| 6,895,249 B2 | 5/2005 | Gaal | | 7,711,094 B1 | 5/2010 | Olshansky |
| 6,900,758 B1 | 5/2005 | Mann | | 7,747,258 B2 * | 6/2010 | Farmer ....................... 455/456.1 |
| 6,903,684 B1 | 6/2005 | Simic | | 7,764,961 B2 | 7/2010 | Zhu |
| 6,904,029 B2 | 6/2005 | Fors | | 7,783,297 B2 | 8/2010 | Ishii |
| 6,907,224 B2 | 6/2005 | Younis | | 2001/0011247 A1 | 8/2001 | O'Flaherty |
| 6,907,238 B2 | 6/2005 | Leung | | 2001/0040886 A1 | 11/2001 | Jimenez |
| 6,912,230 B1 | 6/2005 | Salkini | | 2001/0049274 A1 | 12/2001 | Degraeve |
| 6,912,395 B2 | 6/2005 | Benes | | 2002/0037735 A1 | 3/2002 | Maggenti |
| 6,912,545 B1 | 6/2005 | Lundy | | 2002/0052214 A1 | 5/2002 | Maggenti |
| 6,915,208 B2 | 7/2005 | Garin | | 2002/0061760 A1 | 5/2002 | Maggenti |

| | | |
|---|---|---|
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0086676 A1 | 7/2002 | Hendry |
| 2002/0098832 A1 | 7/2002 | Fleischer |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0118650 A1 | 8/2002 | Jagadeesan |
| 2002/0123327 A1 | 9/2002 | Vataja |
| 2002/0126656 A1 | 9/2002 | Park |
| 2002/0138650 A1 | 9/2002 | Yamamoto |
| 2002/0156732 A1 | 10/2002 | Odijk et al. |
| 2002/0158777 A1 | 10/2002 | Flick |
| 2002/0173317 A1 | 11/2002 | Nykanen |
| 2002/0191595 A1 | 12/2002 | Mar |
| 2003/0009277 A1 | 1/2003 | Fan |
| 2003/0009602 A1 | 1/2003 | Jacobs |
| 2003/0012148 A1 | 1/2003 | Peters |
| 2003/0013449 A1 | 1/2003 | Hose |
| 2003/0016804 A1 | 1/2003 | Sheha |
| 2003/0026245 A1 | 2/2003 | Ejzak |
| 2003/0037163 A1 | 2/2003 | Kitada |
| 2003/0040272 A1 | 2/2003 | Lelievre |
| 2003/0065788 A1 | 4/2003 | Salomaki |
| 2003/0072318 A1 | 4/2003 | Lam |
| 2003/0078064 A1 | 4/2003 | Chan |
| 2003/0081557 A1 | 5/2003 | Mettala |
| 2003/0086422 A1 | 5/2003 | Klinker et al. |
| 2003/0100320 A1 | 5/2003 | Ranjan |
| 2003/0101329 A1 | 5/2003 | Lahti |
| 2003/0101341 A1 | 5/2003 | Kettler |
| 2003/0103484 A1 | 6/2003 | Oommen |
| 2003/0108176 A1 | 6/2003 | Kung |
| 2003/0109245 A1 | 6/2003 | McCalmont |
| 2003/0114157 A1 | 6/2003 | Spitz |
| 2003/0119521 A1 | 6/2003 | Tipnis |
| 2003/0119528 A1 | 6/2003 | Pew |
| 2003/0125042 A1 | 7/2003 | Olrik |
| 2003/0137961 A1 | 7/2003 | Tsirtsis |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0196105 A1 | 10/2003 | Fineburg |
| 2003/0204640 A1 | 10/2003 | Sahineja |
| 2003/0223381 A1 | 12/2003 | Schroderus |
| 2004/0002326 A1 | 1/2004 | Maher |
| 2004/0032485 A1 | 2/2004 | Stephens |
| 2004/0043775 A1 | 3/2004 | Kennedy |
| 2004/0044623 A1 | 3/2004 | Wake |
| 2004/0047461 A1 | 3/2004 | Weisman et al. |
| 2004/0068724 A1 | 4/2004 | Gardner |
| 2004/0092250 A1 | 5/2004 | Valloppillil |
| 2004/0098497 A1 | 5/2004 | Banet |
| 2004/0132465 A1 | 7/2004 | Mattila |
| 2004/0181689 A1 | 9/2004 | Kiyoto |
| 2004/0184584 A1 | 9/2004 | McCalmont |
| 2004/0185875 A1 | 9/2004 | Diacakis |
| 2004/0190497 A1 | 9/2004 | Knox |
| 2004/0198332 A1 | 10/2004 | Lundsgaard |
| 2004/0198386 A1 | 10/2004 | Dupray |
| 2004/0203922 A1 | 10/2004 | Hines et al. |
| 2004/0205151 A1 | 10/2004 | Sprigg |
| 2004/0229632 A1 | 11/2004 | Flynn |
| 2004/0235493 A1 | 11/2004 | Ekerborn |
| 2004/0242238 A1 | 12/2004 | Wang |
| 2004/0267445 A1 | 12/2004 | De Luca |
| 2005/0028034 A1 | 2/2005 | Gantman |
| 2005/0039178 A1 | 2/2005 | Marolia |
| 2005/0041578 A1 | 2/2005 | Huotari |
| 2005/0043037 A1 | 2/2005 | Loppe |
| 2005/0053209 A1 | 3/2005 | D'Evelyn |
| 2005/0071671 A1 | 3/2005 | Karaoguz |
| 2005/0083911 A1 | 4/2005 | Grabelsky |
| 2005/0086467 A1 | 4/2005 | Asokan |
| 2005/0090236 A1 | 4/2005 | Schwinke |
| 2005/0107673 A1 | 5/2005 | Ball |
| 2005/0112030 A1 | 5/2005 | Gaus |
| 2005/0119012 A1 | 6/2005 | Merheb |
| 2005/0134504 A1 | 6/2005 | Harwood |
| 2005/0135569 A1 | 6/2005 | Dickinson |
| 2005/0136885 A1 | 6/2005 | Kaltsukis |
| 2005/0149430 A1 | 7/2005 | Williams |
| 2005/0169248 A1 | 8/2005 | Truesdale |
| 2005/0174991 A1 | 8/2005 | Keagy |
| 2005/0192822 A1 | 9/2005 | Hartenstein |
| 2005/0201529 A1 | 9/2005 | Nelson |
| 2005/0209995 A1 | 9/2005 | Aksu |
| 2005/0213716 A1 | 9/2005 | Zhu |
| 2005/0232252 A1 | 10/2005 | Hoover |
| 2005/0250516 A1 | 11/2005 | Shim |
| 2005/0255857 A1* | 11/2005 | Kim et al. .................. 455/456.1 |
| 2005/0259675 A1 | 11/2005 | Tuohino |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0287979 A1 | 12/2005 | Rollender |
| 2005/0289097 A1 | 12/2005 | Trossen |
| 2006/0008065 A1 | 1/2006 | Longman et al. |
| 2006/0023747 A1 | 2/2006 | Koren et al. |
| 2006/0026288 A1 | 2/2006 | Acharya |
| 2006/0036680 A1 | 2/2006 | Shim |
| 2006/0053225 A1 | 3/2006 | Poikselka |
| 2006/0058042 A1 | 3/2006 | Shim |
| 2006/0058102 A1 | 3/2006 | Nguyen et al. |
| 2006/0068753 A1 | 3/2006 | Karpen |
| 2006/0079249 A1 | 4/2006 | Shim |
| 2006/0120517 A1 | 6/2006 | Moon |
| 2006/0128395 A1 | 6/2006 | Muhonen |
| 2006/0135177 A1 | 6/2006 | Winterbottom |
| 2006/0188083 A1 | 8/2006 | Breen |
| 2006/0193447 A1 | 8/2006 | Schwartz |
| 2006/0212558 A1 | 9/2006 | Sahinoja |
| 2006/0212562 A1 | 9/2006 | Kushwaha |
| 2006/0225090 A1 | 10/2006 | Shim et al. |
| 2006/0234639 A1 | 10/2006 | Kushwaha |
| 2006/0234698 A1 | 10/2006 | Fok |
| 2006/0239205 A1 | 10/2006 | Warren |
| 2006/0258380 A1 | 11/2006 | Liebowitz |
| 2006/0293024 A1 | 12/2006 | Benco |
| 2006/0293066 A1 | 12/2006 | Edge |
| 2007/0003024 A1 | 1/2007 | Olivier |
| 2007/0019614 A1 | 1/2007 | Hoffmann |
| 2007/0022011 A1 | 1/2007 | Altberg |
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0036139 A1 | 2/2007 | Patel |
| 2007/0037585 A1 | 2/2007 | Shim |
| 2007/0041513 A1 | 2/2007 | Gende |
| 2007/0049288 A1 | 3/2007 | Lamprecht |
| 2007/0072624 A1 | 3/2007 | Niemaenmaa |
| 2007/0081635 A1 | 4/2007 | Croak |
| 2007/0082681 A1 | 4/2007 | Kim |
| 2007/0082682 A1 | 4/2007 | Kim |
| 2007/0115941 A1 | 5/2007 | Patel |
| 2007/0121601 A1 | 5/2007 | Kikinis |
| 2007/0149213 A1 | 6/2007 | Lamba |
| 2007/0160036 A1 | 7/2007 | Smith |
| 2007/0162228 A1 | 7/2007 | Mitchell |
| 2007/0167177 A1 | 7/2007 | Kraufvelin |
| 2007/0182547 A1 | 8/2007 | Wachter |
| 2007/0197231 A1 | 8/2007 | Lin |
| 2007/0206568 A1 | 9/2007 | Silver |
| 2007/0206613 A1 | 9/2007 | Silver |
| 2007/0242660 A1 | 10/2007 | Xu |
| 2007/0243885 A1 | 10/2007 | Shim |
| 2007/0263610 A1 | 11/2007 | Mitchell |
| 2007/0270164 A1 | 11/2007 | Maier |
| 2008/0037715 A1 | 2/2008 | Prozeniuk |
| 2008/0063153 A1 | 3/2008 | Krivorot |
| 2008/0065775 A1 | 3/2008 | Polk |

| 2008/0109650 A1 | 5/2008 | Shim |
| 2008/1178595 | 5/2008 | Shahidi |
| 2008/0186164 A1 | 8/2008 | Emigh |
| 2008/0214202 A1 | 9/2008 | Toomey |

FOREIGN PATENT DOCUMENTS

| WO | WO9921380 | 4/1999 |
| WO | PCTUS9928848 | 12/1999 |
| WO | PCTUS0146666 | 11/2001 |
| WO | PCT/US2005/022090 | 6/2005 |
| WO | WO2005/051033 | 6/2005 |
| WO | WO/2006/075856 | 7/2006 |
| WO | WO/2007/027166 | 3/2007 |

OTHER PUBLICATIONS

Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.

International Search Report in PCT/US2007/23243 dated Apr. 2, 2008.

PCT International Search Report (PCTUS2007/23714) and Written Opinion of International Searching Authority, Apr. 18, 2008.

Yilin Ahao, Efficient and reliable date transmission for cellular and GPS based mayday systems, Nov. 1997, IEEE, IEEE Conference on Intelligent Transportation System, 1997. ITSC 97, 555-559.

Qualcomm CDMA Technologies, LBS Control Plane/User Plane Overview—80-VD378-1NP B, 2006, pp. 1-36.

Bhalla et al, TELUS, Technology Strategy—LBS Roaming Summit, Sep. 19, 2006.

Alfredo Aguirre, Ilusacell, First and Only Carrier in Mexico with a 3G CDMA Network, 2007.

Mike McMullen, Sprint, LBS Roaming Summit, Sep. 19, 2006.

Andrew Yeow, BCE, LBS Roaming Summit, Sep. 19, 2006, pp. 1-8.

Nars Haran, U.S. Cellular, Packet Data—Roaming and LBS Overview, Nov. 2, 2007, pp. 1-15.

Qualcomm CDMA Technologies, LBS Control Plane Roaming—80-VD377-1NP A, 2006, pp. 1-10.

Qualcomm CDMA Technologies, MS Resident User Plane LBS Roaming—80-VC718-1 E, 2006, pp. 1-37.

$3^{rd}$ Generation Partnership Project 2, Position Determination Service Standard for Dual Mode Spread Spectrum Systems, Feb. 16, 2001, pp. i-X, 1-1-1-5, 2-1-2-2, 3-1-3-51, 4-1-4-66, A-1-A-2, B-1-B-2, C-1-C-2, D-1-D-2.

Location Based Services V2 Roaming Support (non proprietary), 80-V8470-2NP A, dated Jan. 27, 2005, pp. 1-56.

Intrado Inc., Qwest Detailed SR/ALI to MPC/GMLC Interface Specification for TCP/IP Implementation of TIA/EIA/J-STD-036 E2 with Phase I Location Description Addition. Intrado Informed Response; Apr. 2004; Issue 1.11; pp. 1-57.

* cited by examiner

FIG. 1    XRG CALL FLOW FOR ROAMING LBS REQUEST

ROAMING GATEWAY ENABLING LOCATION BASED SERVICES (LBS) ROAMING FOR USER PLANE IN CDMA NETWORKS WITHOUT REQUIRING USE OF A MOBILE POSITIONING CENTER (MPC)

BACKGROUND OF THE INVENTION

1. Field of the Invention

This invention pertains to wireless services, and more particularly to wireless location based services roaming particularly in a CDMA wireless network.

2. Background of Related Art

Location based services (LBS) refer to a broad range of services that are based on (or enhanced by) information about the physical location of a user and/or device. Typical location-based services for consumers might include real-time turn-by-turn directions, the location of the nearest gas station or motel, or social networking services. What makes the service location-based is that it knows your location automatically, without entering a street address, for example.

Location based services are typically made available to a user via a WAP site, or downloadable software (e.g., Java, BREW, Symbian, etc.) They can also be made available in some cases via voice or text messaging. Some location-based services report location to a third party, such as parents tracking the location of children, or businesses tracking a fleet of vehicles.

Location based services exploit knowledge about where an information device user is located. For example, the user of a wireless-connected smartphone could be shown advertisements specific to the region that a wireless user is traveling in.

U.S. Pat. No. 7,209,758 to Moll et al. (Moll) discloses a method and system for sharing and centralizing mobile positioning information and geospatial data for roaming mobile subscriber terminals, the entirety of which is expressly incorporated herein by reference. Moll shows, e.g., in FIG. 6 of U.S. Pat. No. 7,209,758, typical conventional call flow for serving a location based service (LBS).

Figure 3:
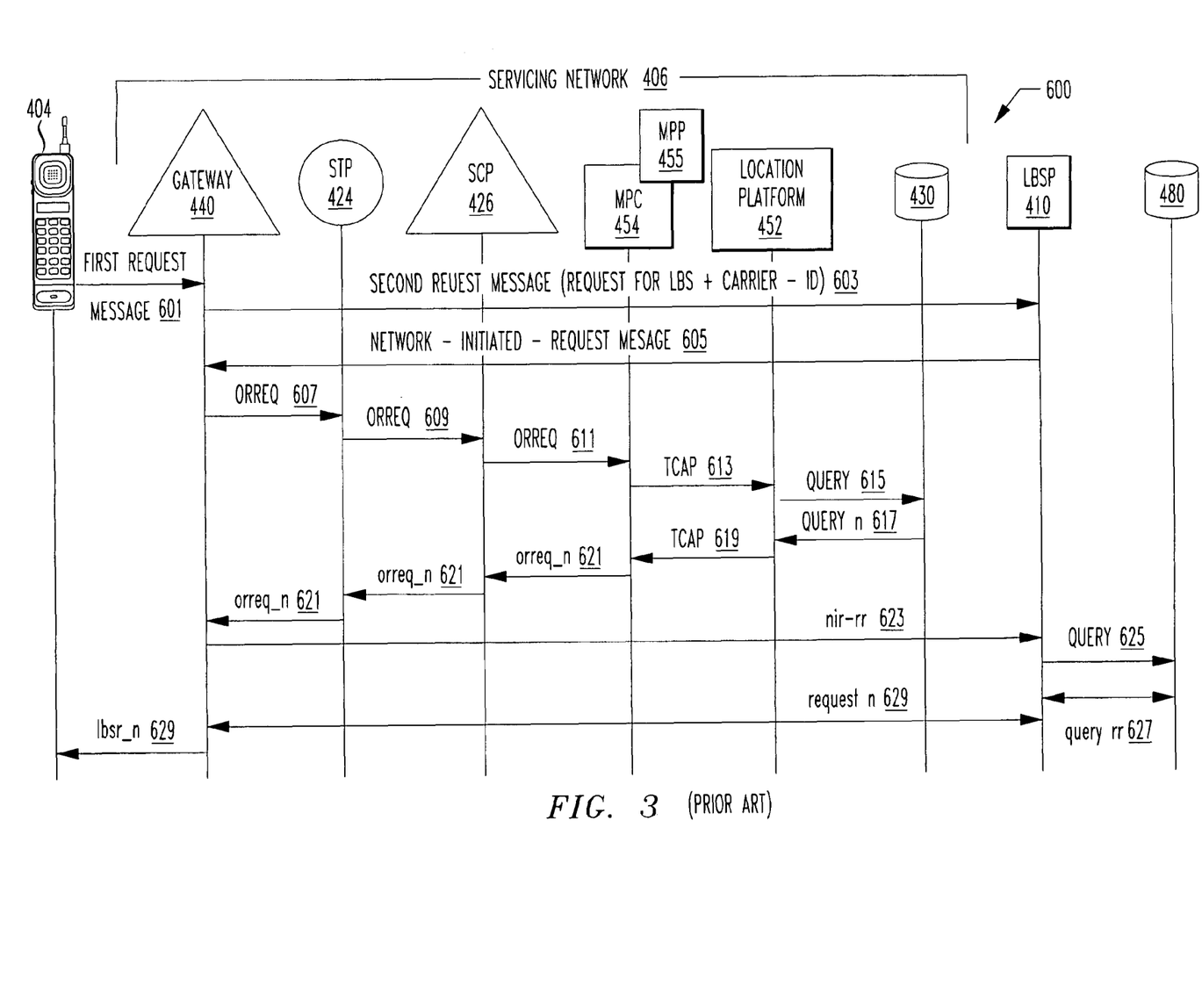
FIG. 3 shows a first call flow diagram illustrating a conventional call flow for serving LBSs to a mobile subscriber terminal when roaming in a coverage area of a serving network.

FIG. 6 of Moll, copied herein as prior art FIG. 3, is a call flow diagram illustrating a call flow 600 for serving an LBS in a system. After registration in the serving network 406, a user of a mobile subscriber terminal (MST) 404 may initiate a request for an LBS from an LBS provider 410. To do so, the user of the MST 404 may enter digits or characters into the MST 404 and then press a "Talk" or "Send" key or select a wireless web LBS application that initiates a request for an LBS.

The dialed digits and/or characters may be sent to a serving-network gateway 440 as a first request message 601 that may be, for example, formatted according to IS-2000 and/or IS-95. As such, the first request message 601 may contain information identifying the serving network 406 that is normally sent, for example, as part of an IS-2000 and/or IS-95 message (e.g., the MSCID, SYSID and NETID parameters).

After receipt of the first request message 601, the serving-network gateway 440 parses the information identifying the serving network 406 (hereinafter referred to as a "carrier-ID") from the first request message 601 so as to preserve the carrier-ID, which will change if the first request message 601 traverses from the serving network 406 to the subscriber network 412. The serving-network gateway 440 then couples (e.g., inserts, appends, integrates into, commingles, encapsulates, or otherwise associates) the carrier-ID to the request for an LBS and then places the combination in a second request message 603. Thereafter, the serving-network gateway 440 sends the second request message 603 to the LBS provider 410.

After receiving the second request message, the LBS provider 410 may parse the carrier-ID from the request for the LBS contained in the second request message 603. The LBS provider 410 may then use the carrier-ID to address or otherwise direct to the serving-network gateway 440 a network-initiated-request message 605 to obtain the mobile-position information associated with the MST 404. Thereafter, the LBS provider 410 may send the network-initiated-request message 605 back to the serving-network gateway 440.

The serving-network gateway 440 handles the call processing for the network-initiated-request message 605, and initiates a process to send a first Origination Request message (ORREQ) 607 to the STP 424. The STP 424 selects the SCP 426 and forwards to it a second ORREQ message 609.

The second ORREQ message 609 may contain an indication that the destination for the second ORREQ message 609 is a router process on the MPC 454. Also contained in the ORREQ message 609 are numerous parameters, preferably including the telephone number of the MST 404, the ESN of the MST 404, the granularity of mobile positioning information that is authorized, the frequency and band class of the serving base station, and the base station's Cell ID and Sector ID. The SCP 426 may glean some or all of this information from the HLR 450 and/or VLR 428.

Based on the destination indication within the second ORREQ message 609, the SCP 426 sends to the MPP 455 running on the MPC 454 a third ORREQ message 611 containing the parameters in the second ORREQ message 409. The MPP 455 may then compare the carrier-ID against an internal table or list to determine if the serving network 406 is authorized to provide location based services to the mobile subscriber terminal 404. The comparison may be carried out to determine whether the serving network 406 has partnered with the subscriber network 412 as well as privacy purposes.

Once authorization is given, the MPP 455 may responsively query the serving-network location platform 452 by way of a Transaction Capabilities message (TCAP) 613. The MPP 455 may also provide the location platform 452 with the Cell ID and Sector ID of the BTS 420. The location platform 452 may then send a first query message 615 to the LI database 430 for the MSCID, Cell ID and Sector ID to obtain a cell-sector's centroid, which may be a relative center of the coverage of a cell sector. Responsive to the first query message 615, the LI database 430 returns the requested information in a first query_rr message 617.

If the location granularity for the request is authorized for only cell sector centroid, then the location platform 452 responds to the MPP 455 using a second TCAP message 619, the content of which may include the cell-sector's centroid. The MPP 455 then responds to the third ORREQ message 611 with an ORREQ Return Result (orreq_rr) message 621, which in turn contains the cell-sector's centroid. This information is passed back to the serving-network gateway 440, which then sends to the LBS provider 410 a response to the network-initiated-request message in the form of a network-initiated-request return result (nir_rr) message 623, which contains the information from the orreq_rr message 621.

After the LBS provider 410 obtains the cell-sector's centroid from the nir_rr message 623, it may issue a second query message 625 to the GIS data store 480 to obtain geocode data corresponding to the cell-sector's centroid. Responsive to the second query 625, the GIS data store 480 returns to the LBS provider 410 a query return result (query_rr) message 627 containing the geocode information. Using the cell-sector's centroid received from the location platform 452 and the geocode, the LBS provider 410 formulates a response to the request for the LBS. Thereafter, the LBS provider 410 sends to the MST 404 via the serving-network-gateway 440 a request_rr message 629 containing the response to the request for the LBS.

Figure 4:
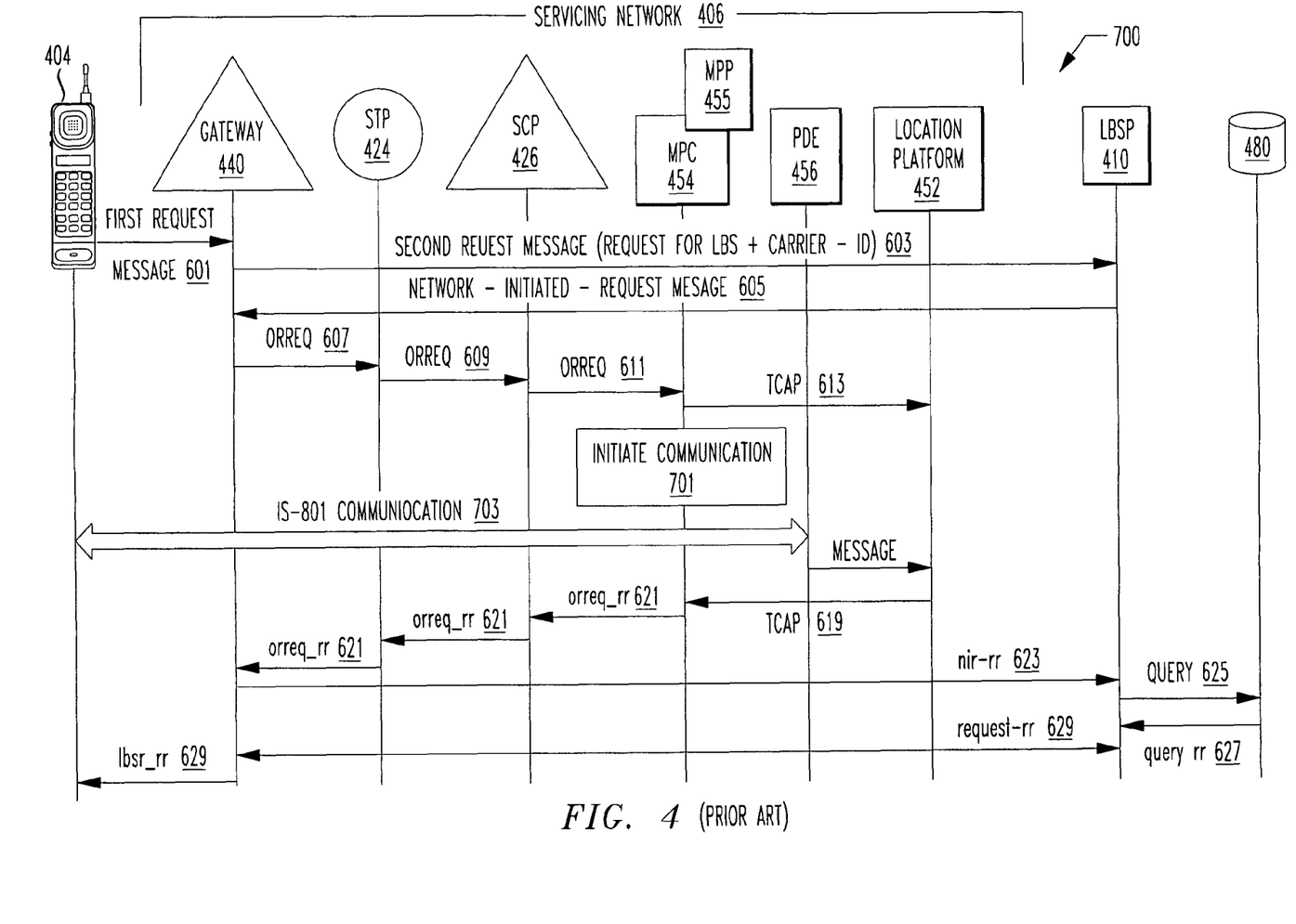
FIG. 4 shows a second call flow diagram of a conventional system for providing location based services to a mobile subscriber terminal roaming outside a coverage area of a location based service provider and inside a coverage area of a serving network.

FIG. 7 of Moll, copied herein as prior art FIG. 4, is a call flow diagram illustrating a call flow 700 for serving detailed mobile positioning information to the MST 404 in a system. The call flow 700 shown in FIG. 4 is similar to the call flow 600 shown in FIG. 6, except as described herein. Included in FIG. 4 is the position determining equipment (PDE) 456 for the serving network 406. As described in the J-STD-036 standard, the MPC 454 may use the PDE 456 to provide more granular mobile positioning information than the can be provide by MPC 454 alone. Thus, if authorized for detailed mobile positioning information for the MST 404 and if the MST 404 is compatible with the PDE 456, then the MPC 454 may use the PDE 456 to obtain the detailed mobile positioning information.

Referring now to FIG. 4 at call flow element 701, the MPC 454 may initiate a communication, e.g., an IS-801-A communication 703, between the MST 404 and the PDE 456 (assuming the MST 404 is compatible with the PDE 456) to obtain mobile positioning information about the MST 404. Details of the IS-801-A standard may be found in the TIA/EIA/IS-801-A standard, which was published by Telecommunications Industry Association, on Apr. 7, 2004, and which is fully incorporated herein by reference.

The PDE 456 may receive mobile positioning information from the MST 404 itself. To determine its position, however, the PDE 456 may provide to the MST 404 some baseline navigational information to enable the MST 404 to roughly establish its position. The MST 404 may then use a terrestrial positioning system, a celestial positioning system, or a combination of these systems to establish its position. Terrestrial positioning systems utilize various techniques, such as forward link trilaterization ("FLT"), advanced forward link trilaterization ("AFLT"), amplitude difference, angle of arrival ("AD-AOA"), and enhanced observed time difference ("EOTD") to generate mobile positioning information. GPS is an example of a celestial positioning system.

In response to the baseline navigational information, the MST 404 may return to the PDE 456 more precise navigational information including, for example, GPS coordinates and/or pseudo range information as defined by IS-801-A, and/or pseudorandom noise (PN) code offset measurements as defined by IS-801-A. If not already supplied in latitude, longitude, bearing, etc, the PDE 456 may then perform signal processing on the data retrieved from the MST 404 to generate mobile positioning information in this format. The PDE 456 may then forward this navigational information to the location platform 452 in a J-STD-036 message 705. The location platform 452 may then send the second TCAP 619 as described above. The second TCAP 619 contains the navigational information provided by the PDE 456.

Alternatively, the location platform 452 may send the navigational information to a Wireless Automatic Location Information (WALI) process as defined in J-STD-036 standard. The WALI process may send the navigational information to the Location Information (LI) database 430 for transmission to the MPC 454. In another alternatively, the location platform may place the navigational information in a pull table (not shown), where the MPC 454 or other entity, such as the LBSP 410, can retrieve it.

Currently the only support for location based services (LBS) roaming is defined via the use of Mobile Position Centers (MPCs) in Qualcomm recommended standards. For instance, current roaming support is defined in the CDMA standards as being supported by mobile position center (MPC) to MPC architecture and communications. However, not many CDMA networks have a working implementation of this standard.

SUMMARY OF THE INVENTION

A method and apparatus for facilitating location based services (LBS) to a roaming mobile device in accordance with the principles of the present invention comprises receiving IS-801 session data containing a message originated by an interrogating mobile device in a first carrier network to a routing LBS gateway. The IS-801 session data is routed to a correct visited carrier network position determining entity (PDE) that contains the correct base station almanac (BSA) data. The obtained correct assistance data is returned to the interrogating mobile device. Accordingly, LBS roaming is facilitated between CDMA network carriers that use a PDE and not an mobile positioning center (MPC) to provide assistance data to a mobile device.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides solutions to support location based services (LBS) to CDMA mobiles while roaming on another network. IS-801 session data is routed by a routing gateway to a correct visited network position determining equipment (PDE) that contains correct base station almanac (BSA) data used to determine assistance data, which is then returned to an interrogating mobile device. A standalone roaming LBS routing gateway (XRG) provides network connectivity between PDE equipment in multiple carrier networks.

In particular, in accordance with the principles of the present invention, a routing gateway inspects IS-801 session data to determine the identity of the visited network, and the identity of the original home network of the CDMA mobile that initiates the given IS-801 session. The routing gateway then routes the session to the correct visited network position determining equipment (PDE) to obtain the correct assistance data, which is then returned to the interrogating mobile.

Conventionally, location based services (LBS) roaming support is defined via the use of Mobile Position Centers (MPCs), e.g., See Qualcomm recommended standards. The inventive architecture and method implements a roaming LBS gateway to enable roaming between CDMA carriers that are only using a PDE (Positioning Determining Entity) for this purpose, since a mobile position center (MPC) is typically an optional network node according to location based services (LBS) specifications.

The roaming gateway takes IS-801 position determination data messages from a mobile sent over Internet protocol (IP). The roaming gateway inspects the information contained in the IS-801 message that identifies the originating network of the CDMA subscriber, namely the system ID (SID) and network ID (NID) that can determine which network the customer is visiting. Using this information the roaming gateway routes the IS-801 session to the visited network position determining equipment (PDE) based on a table of the relevant network's position determining equipment (PDE) Internet protocol (IP) address and port number to establish the TCP/IP connection.

Figure 1:
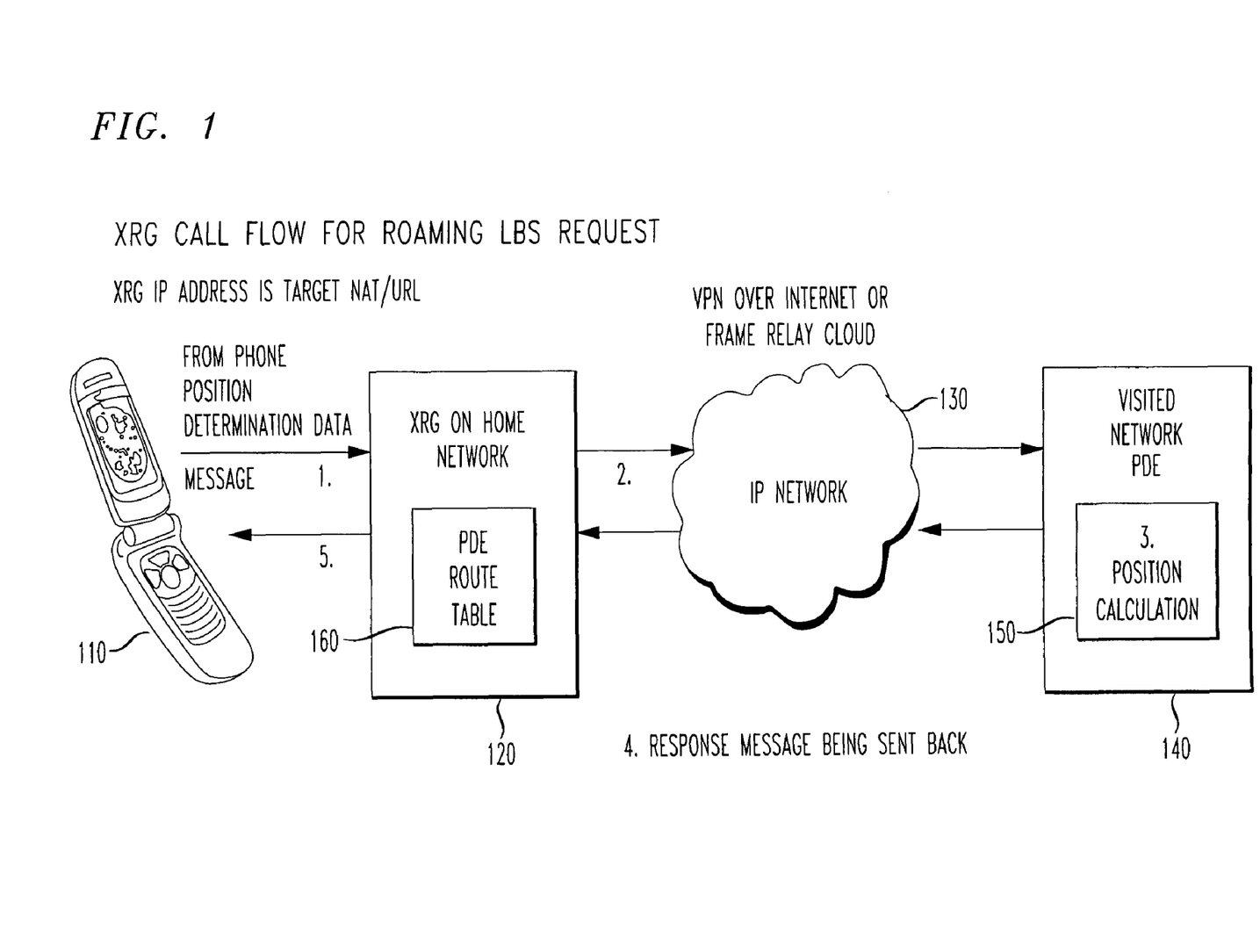
FIG. 1 shows exemplary roaming LBS routing gateway (XRG) call flow for a roaming location based services (LBS) request, in accordance with the principles of the present invention.

FIG. 1 shows exemplary roaming LBS routing gateway (XRG) call flow for a roaming location based services (LBS) request, in accordance with the principles of the present invention.

In particular, FIG. 1 shows exemplary call flow between a mobile device 110, a roaming gateway 120 on the mobile device's home network, an Internet Protocol (IP) network 130 (e.g., the Internet), and a visited network PDE 140, without requiring call flow via a mobile positioning center (MPC). The exemplary roaming LBS routing gateway (XRG) on the home network 120 preferably includes a suitable PDE route table 160. The visited network PDE 140 includes a suitable position calculation module 150.

Steps 1 to 5 show exemplary call flow for a LBS request from a roaming mobile device 110.

In particular, as shown in step 1 of FIG. 1, the mobile device (MS) 110 includes a global positioning system (GPS) chip (e.g., GPSOne chip). The mobile device 110 establishes an IS-801 session, and sends a position determination data message on Internet protocol (IP) user plane. The target IP address of this position determination data message is the exemplary roaming LBS routing gateway (XRG) 120 on the home network, so that the XRG 120 receives the transmitted position determination message.

In step 2, the roaming LBS routing gateway XRG 120 opens up the received IS-801 message to determine the base ID, system ID, and network ID: If determined to be a roamer route to visited network PDE 140.

The roaming LBS routing gateway XRG 120 dips into a position determining equipment (PDE) route table 160 to determine the PDE IP address and port information. Note that this assumes that the visited partner network opens the position determining equipment (PDE) to this connection.

In step 3, the visited network position determining equipment (PDE) 140 receives the IS-801 message, performs a calculation using a BSA data and satellite reference feed, provides assistance data, and returns a position calculation.

In step 4, the position determination response is sent back to the XRG 120.

In step 5, the XRG 120 sends the IS-801 message including the position determination response back to the requesting mobile station (MS) 110.

Figure 2:
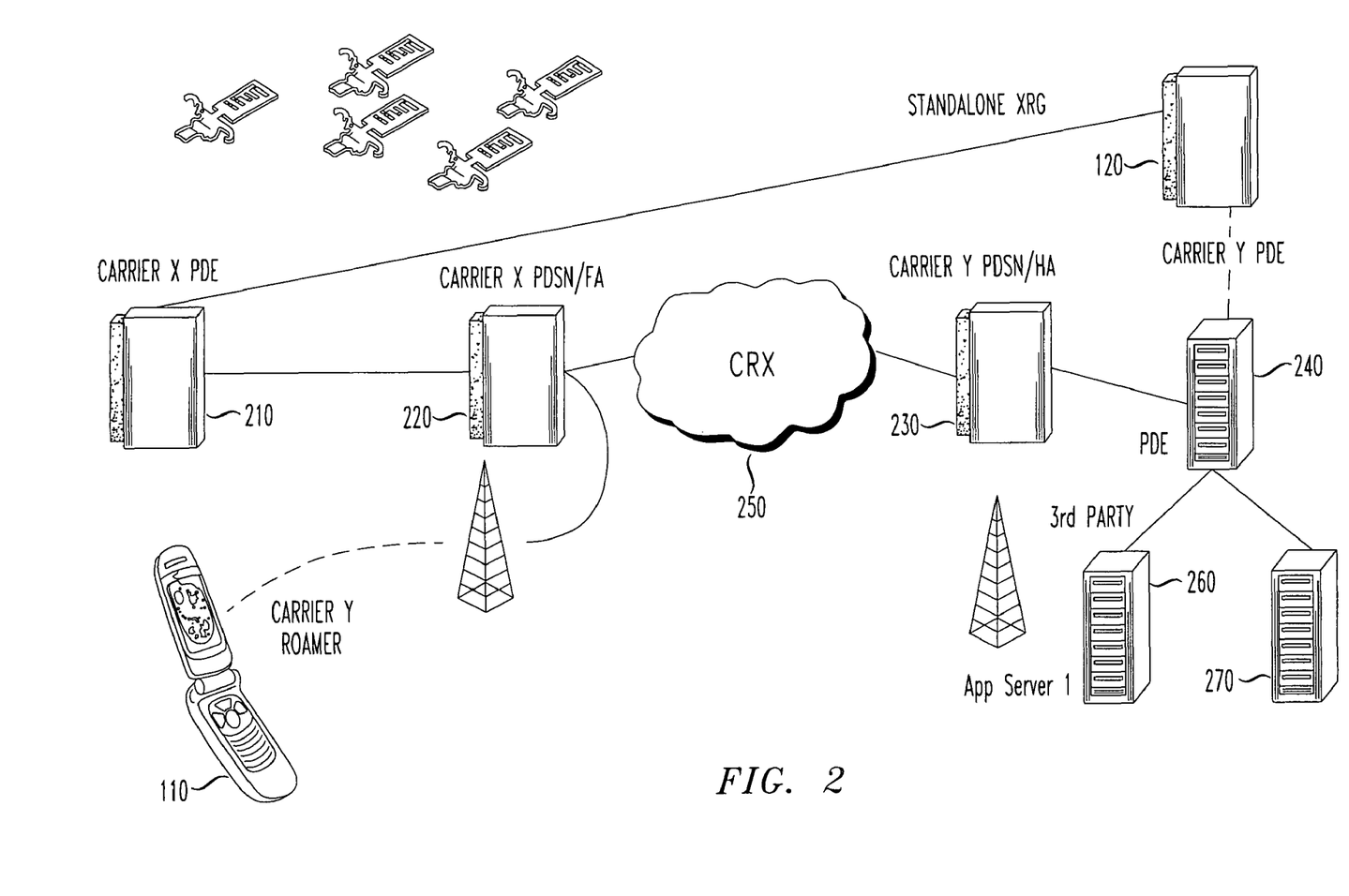
FIG. 2 shows an exemplary diagram of network connectivity, in accordance with the principles of the present invention.

FIG. 2 shows an exemplary diagram of network connectivity between a standalone roaming gateway 120 and carrier position determining equipment, in accordance with the principles of the present invention.

In particular, the network diagram of FIG. 2 illustrates the use of a roaming LBS routing gateway (XRG) 120 to support location request roaming between carrier networks including respective PDE equipment 210, 240.

The roaming LBS routing gateway XRG 120 communicates on a User Plane with carrier X PDE 210 as described with respect to FIG. 1, as well as with carrier Y PDE 240.

The methodology and architecture shown in FIGS. 1 and 2 work in most cases even if the other visited network is a trusted or non-trusted network (as defined by CDG specifications for V1 and v2 Location based services).

The invention has particular applicability to user's of mobile devices including a LBS application, e.g., a fleet of people driving ground transportation vehicles.

While the invention has been described with reference to the exemplary embodiments thereof, those skilled in the art will be able to make various modifications to the described embodiments of the invention without departing from the true spirit and scope of the invention.

What is claimed is:

1. A method of facilitating location based services (LBS) to a roaming mobile device, comprising:
   receiving IS-801 session data containing a message originated by an interrogating mobile device in a first carrier network to a routing LBS gateway, wherein said received IS-801 session data determines:
      an identity of said visited carrier network; and
      an identity of an original home network of said interrogating mobile device;
   routing said IS-801 session data to a correct visited carrier network position determining entity (PDE) that contains correct base station almanac (BSA) data; and
   returning assistance data to said interrogating mobile device;
   wherein said routing LBS gateway is located outside of said first and second carrier network; and
   wherein LBS roaming is facilitated between CDMA network carriers that use a PDE and not a mobile positioning center (MPC) to provide assistance data to a mobile device.

2. The method of facilitating location based services (LBS) to a roaming mobile device according to claim 1, wherein:
   said identity of said visited carrier network includes a system ID (SID) and a network ID (NID).

3. The method of facilitating location based services (LBS) to a roaming mobile device according to claim 1, wherein:
   said mobile device is a CDMA device.

4. The method of facilitating location based services (LBS) to a roaming mobile device according to claim 1, wherein:
   said routing LBS gateway is located outside of said first carrier network.

5. The method of facilitating location based services (LBS) to a roaming mobile device according to claim 1, wherein:
   said routing LBS gateway is located outside of said second carrier network.

6. A method of facilitating location based services (LBS) to a roaming mobile device, comprising:
   receiving IS-801 session data containing a message originated by an interrogating mobile device in a first carrier network to a routing LBS gateway;
   routing said IS-801 session data to a correct visited carrier network position determining entity (PDE) that contains correct base station almanac (BSA) data;
   returning assistance data to said interrogating mobile device; and querying a PDE route table to determine an Internet protocol (IP) address and port number of said correct visited PDE;

wherein LBS roaming is facilitated between CDMA network carriers that use a PDE and not a mobile positioning center (MPC) to provide assistance data to a mobile device; and whereby a TCP/IP connection is established between a roaming LBS routing gateway and a correct visited PDE.

7. Apparatus for facilitating location based services (LBS) to a roaming mobile device, comprising:

means for receiving IS-801 session data containing a message originated by an interrogating mobile device in a first carrier network to a routing LBS gateway;

means for routing said IS-801 session data to a correct visited carrier network position determining entity (PDE) that contains correct base station almanac (BSA) data, wherein said received IS-801 session data determines:
- an identity of said visited carrier network; and
- an identity of an original home network of said interrogating mobile device; and means for returning assistance data to said interrogating mobile device;

wherein LBS roaming is facilitated between CDMA network carriers that use a PDE and not a mobile positioning center (MPC) to provide assistance data to a mobile device; and wherein said routing LBS gateway is located outside of said CDMA network carriers' networks.

8. The apparatus for facilitating location based services (LBS) to a roaming mobile device according to claim 7, wherein:

said identity of said visited carrier network includes a system ID (SID) and a network ID (NID).

9. The apparatus for facilitating location based services (LBS) to a roaming mobile device according to claim 7, wherein:

said mobile device is a CDMA device.

10. The apparatus for facilitating location based services (LBS) to a roaming mobile device according to claim 7, wherein:

said routing LBS gateway is located outside of said first carrier network.

11. The apparatus for facilitating location based services (LBS) to a roaming mobile device according to claim 7, wherein:

said routing LBS gateway is located outside of the second carrier network.

12. Apparatus for facilitating location based services (LBS) to a roaming mobile device, comprising:

means for receiving IS-801 session data containing a message originated by an interrogating mobile device in a first carrier network to a routing LBS gateway;

means for routing said IS-801 session data to a correct visited carrier network position determining entity (PDE) that contains correct base station almanac (BSA) data;

means for returning assistance data to said interrogating mobile device; and means for querying a PDE route table to determine an Internet protocol (IP) address and port number of said correct visited PDE;

wherein LBS roaming is facilitated between CDMA network carriers that use a PDE and not a mobile positioning center (MPC) to provide assistance data to a mobile device; and whereby a TCP/IP connection is established between a roaming LBS routing gateway and a correct visited PDE.

* * * * *